(12) United States Patent
Hung et al.

(10) Patent No.: US 8,988,863 B2
(45) Date of Patent: Mar. 24, 2015

(54) PORTABLE ELECTRONIC DEVICE

(71) Applicant: Wistron Corporation, New Taipei (TW)

(72) Inventors: Ming-Hua Hung, New Taipei (TW);
Tian-Shyang Lin, New Taipei (TW);
Shu-Chen Chiang, Changhua County (TW)

(73) Assignee: Wistron Corporation, New Taipei (TW)

( * ) Notice: Subject to any disclaimer, the term of this patent is extended or adjusted under 35 U.S.C. 154(b) by 173 days.

(21) Appl. No.: 13/917,357

(22) Filed: Jun. 13, 2013

(65) Prior Publication Data

US 2014/0092540 A1   Apr. 3, 2014

(30) Foreign Application Priority Data

Sep. 28, 2012   (TW) .............................. 101135932 A

(51) Int. Cl.
*G06F 1/16* (2006.01)

(52) U.S. Cl.
CPC .............. *G06F 1/1601* (2013.01); *G06F 1/162* (2013.01); *Y10S 248/917* (2013.01); *Y10S 248/918* (2013.01)
USPC ............ 361/679.08; 361/679.26; 361/679.27; 248/917; 248/918; 312/223.1; 312/223.2

(58) Field of Classification Search
CPC .... G06F 1/1601; G06F 1/1616; G06F 1/1624
USPC .................................................. 361/679.08
See application file for complete search history.

(56) References Cited

U.S. PATENT DOCUMENTS

| 7,059,576 | B2 * | 6/2006 | Chen et al. ..................... 248/371 |
| 7,255,317 | B2 * | 8/2007 | Huang et al. .................. 248/371 |
| 7,677,509 | B2 * | 3/2010 | Jang ........................... 248/176.1 |
| 8,520,371 | B2 * | 8/2013 | Peng et al. ............... 361/679.01 |
| 2005/0105263 | A1 * | 5/2005 | Tanaka et al. ................. 361/683 |
| 2007/0030634 | A1 * | 2/2007 | Maskatia ...................... 361/683 |
| 2008/0137273 | A1 * | 6/2008 | Li et al. ........................ 361/681 |
| 2008/0174943 | A1 | 7/2008 | Hirasawa et al. |
| 2010/0271770 | A1 * | 10/2010 | Sellers ..................... 361/679.08 |
| 2012/0229962 | A1 | 9/2012 | Chen et al. |
| 2012/0314980 | A1 * | 12/2012 | Chen et al. ...................... 384/26 |
| 2013/0242521 | A1 | 9/2013 | Lin et al. |

FOREIGN PATENT DOCUMENTS

| TW | M382748 | 6/2010 |
| TW | M434422 U | 7/2012 |
| TW | 201238447 A | 9/2012 |

* cited by examiner

*Primary Examiner* — Anthony Q Edwards
(74) *Attorney, Agent, or Firm* — Muncy, Geissler, Olds & Lowe, P.C.

(57) ABSTRACT

A portable electronic device includes a computer body, a display, and a telescopic structure respectively connected to the computer body and the display. The computer body has a first side edge; the display has a backside; and the telescopic structure includes a first plate and a second plate. The first plate is rotatably connected to the first side edge of the computer body; the second plate is rotatably connected to the backside of the display, and is slidably connected to the first plate. Through engaging a projecting tooth of the first plate with one of grooves of the second plate, different opening angles between the display and the computer body may be assumed.

11 Claims, 11 Drawing Sheets

PORTABLE ELECTRONIC DEVICE

CROSS-REFERENCES TO RELATED APPLICATIONS

This non-provisional application claims priority under 35 U.S.C. §119(a) on Patent Application No. 101135932 filed in Taiwan, R.O.C. on Sep. 28, 2012, the entire contents of which are hereby incorporated by reference.

BACKGROUND OF THE INVENTION

1. Technical Field

The present invention relates to a portable electronic device.

2. Related Art

With the increasing popularity of the touch technology, an increasing number of portable electronic devices are using operating systems supporting the touch technology and software and hardware with support for the operating systems. However, when a display of a conventional portable electronic device is opened with respect to a computer body, the display is fixed to a certain angle merely by relying on a friction or an elastic force between a bottom edge of the display and a side edge of the computer body. Therefore, if a user performs a touch operation directly, inconvenience results from the display being shaken easily.

Another manner is that the bottom edge of the display is not directly connected to the side edge of the computer body, and a support member is disposed on a backside of the display, where both ends of the support member are respectively rotatably connected to the backside of the display and the side edge of the computer body. In this way, when the display is opened, the bottom edge of the display slides to a specific angle with respect to the computer body and abuts to a specific groove; and then, the support member supports the display at an angle almost perpendicular to the display. Therefore, when the user performs the touch operation on the display, the display does not shake drastically.

In addition, another manner is improving the aforementioned support member, for example, the support member is replaced by two plates capable of rotating and translating mutually, so that, through the rotation and translation of the two plates, a function of changing an included angle between the display and the computer body is achieved. Although, in this way, the change possibility of the included angle between the display and the computer body is increased, with the increase in the change possibility of the included angle, a structure thereof is increasingly complicated. Currently, as a known portable electronic device having the two plates capable of rotating and translating mutually as the support member, the angle of the portable electronic device has five changes.

Consequently, for the convention portable electronic device, especially a tablet computer having a physical keyboard on the computer body and a display with the touch operation function, an opening angle between the display and the computer body is restricted from changing randomly.

SUMMARY

In view of the above, the present invention is directed to a portable electronic device, including a computer body, a display, and a telescopic structure, where the display forms different angles with respect to the display mainly through the telescopic structure. The computer body has a first side edge, the display has a backside, and the telescopic structure includes a first plate and a second plate. The first plate has a first surface, a first connecting edge, and a projecting tooth, where the first connecting edge is located on one side of the first surface and is rotatably connected to the first side edge of the computer body; and the projecting tooth projects from the first surface. The second plate faces the first place and is slidably coupled to the first plate, and has a second connecting edge, a second surface, and a plurality of grooves disposed on the second surface. The second connecting edge is located on the other side of the second surface opposite to the first connecting edge and is rotatably connected to the backside of the display. The second surface faces the first surface so that the projecting tooth of the second surface is engaged with one of the grooves. When the display assumes an angle with respect to the computer body through the support of the telescopic structure, the second plate may slide along a sliding direction with respect to the first plate so that the projecting tooth is engaged with different grooves, for adjusting the length of the telescopic structure and changing the angle according to the length of the telescopic structure, thereby realizing multiple changes of an included angle between the display and the computer body.

In summary, in the portable electronic device provided according to the idea of the present invention, the included angle between the display and the computer body may have multiple changes by engaging the projecting tooth of the first plate with each groove of the second plate.

BRIEF DESCRIPTION OF THE DRAWINGS

The disclosure will become more fully understood from the detailed description given herein below for illustration only, and thus not limitative of the present invention, wherein.

DETAILED DESCRIPTION

Figure 1A:
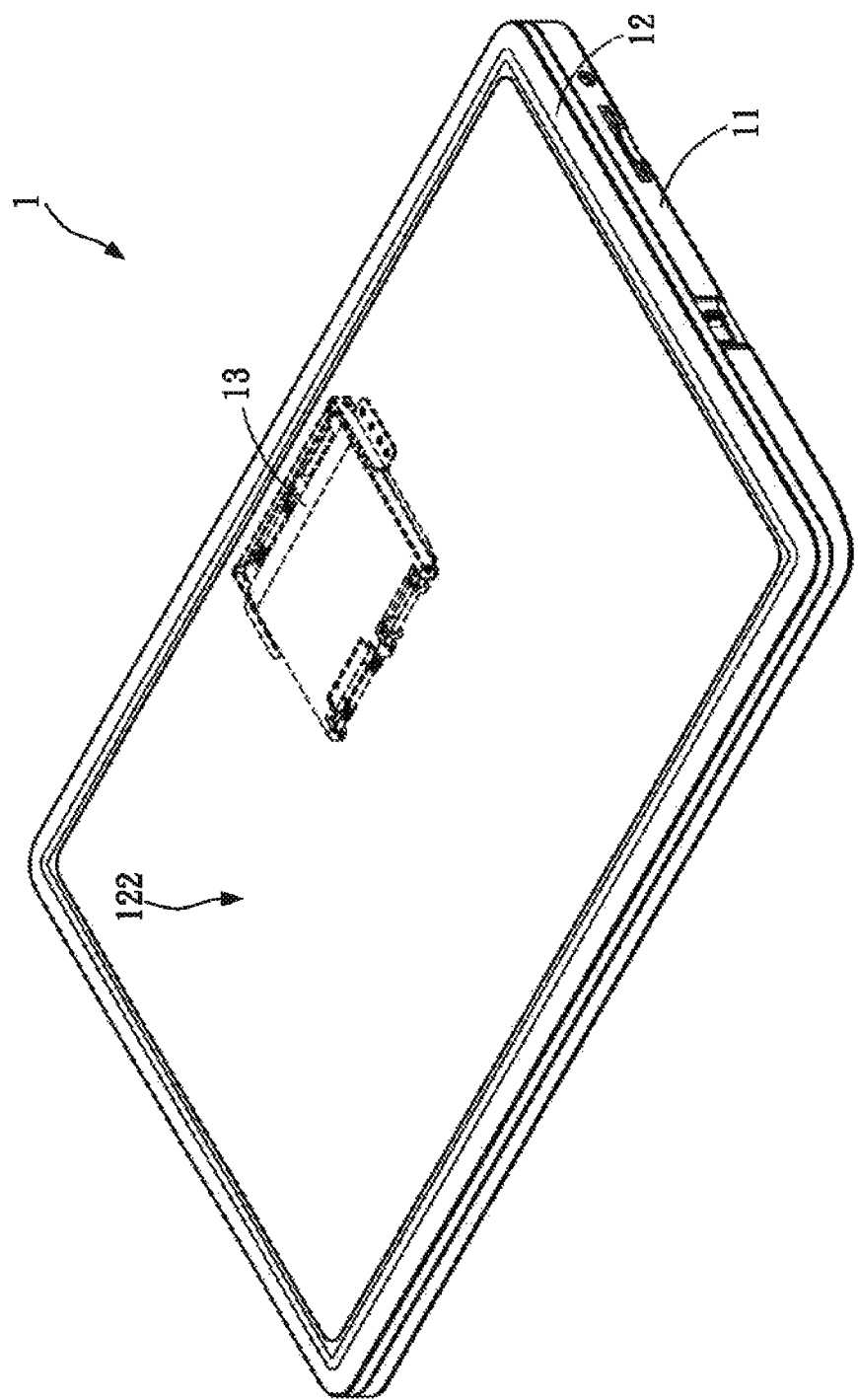
FIG. 1A is a schematic view (1) of a specific embodiment of the present invention.
Figure 1B:
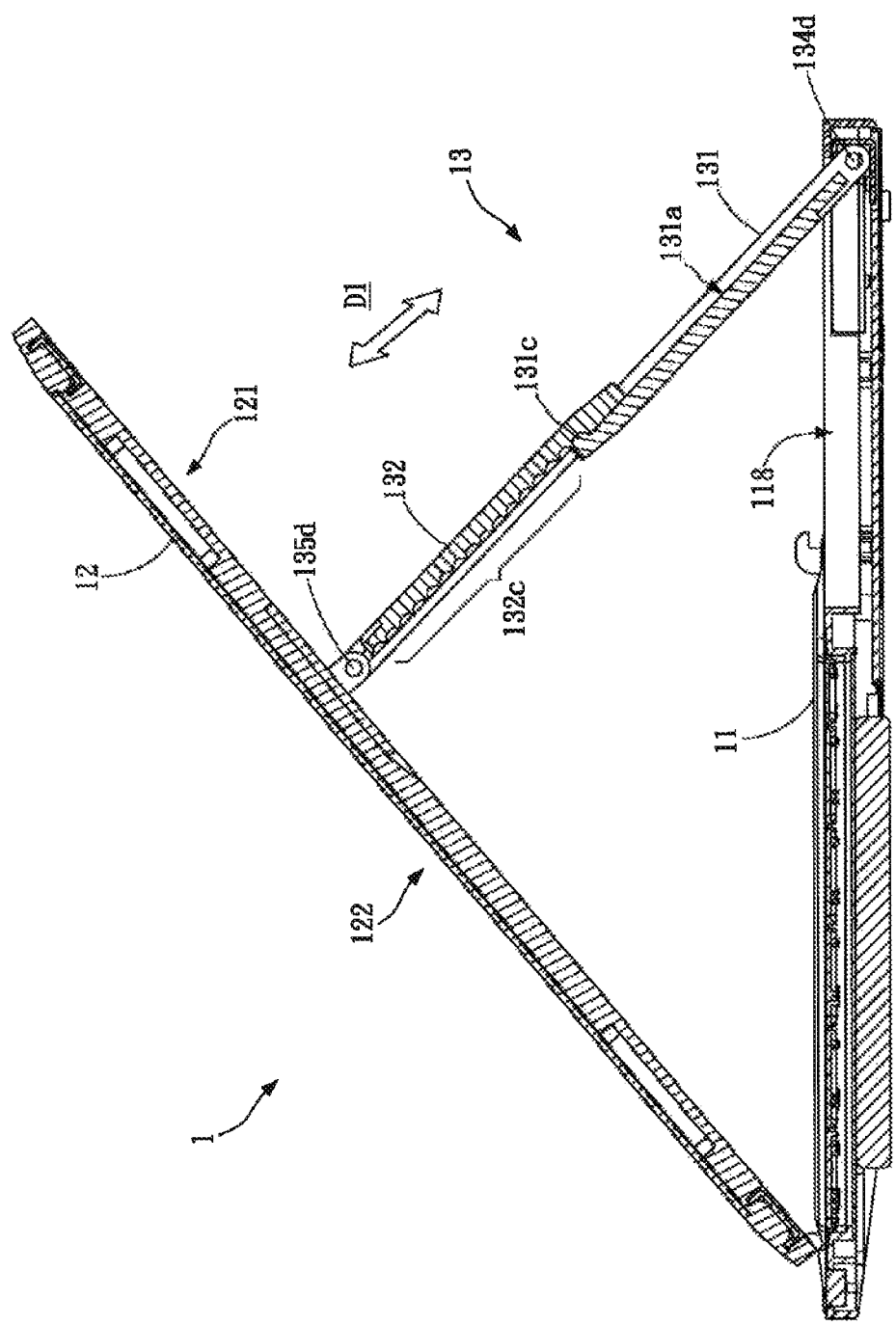
FIG. 1B is a schematic view (2) of a specific embodiment of the present invention.
Figure 2:
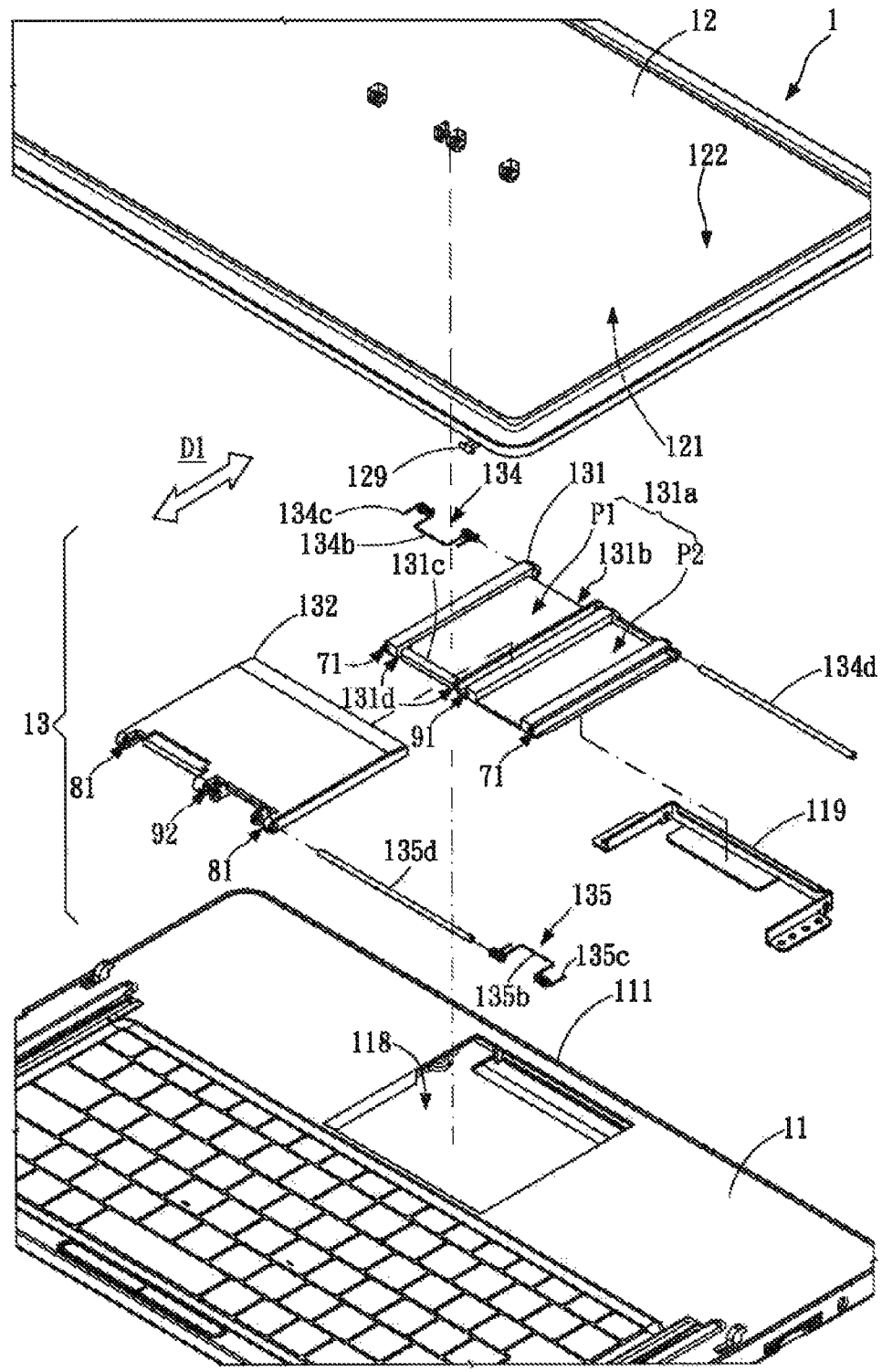
FIG. 2 is an exploded view of a specific embodiment of the present invention.

FIG. 1A, FIG. 1B and FIG. 2 are respectively combination views and an exploded view of a specific embodiment of the present invention, disclosing a portable electronic device 1 including a computer body 11, a display 12, and a telescopic structure 13. The display 12 is capable of forming multiple opening angles with respect to the computer body 11 through the telescopic structure 13. The computer body 11 has a first side edge 111; the display 12 has a backside 121 and a display surface 122; the telescopic structure 13 includes a first plate 131 and a second plate 132, where the first plate 131 and the second plate 132 are capable of sliding along a sliding direction D1, and the sliding direction D1 is parallel to plate surfaces of the first plate 131 and the second plate 132. How to realize different changes of the opening angle between the computer body 11 and the display 12 through the telescopic structure 13 is further described in the following.

Figure 3A:
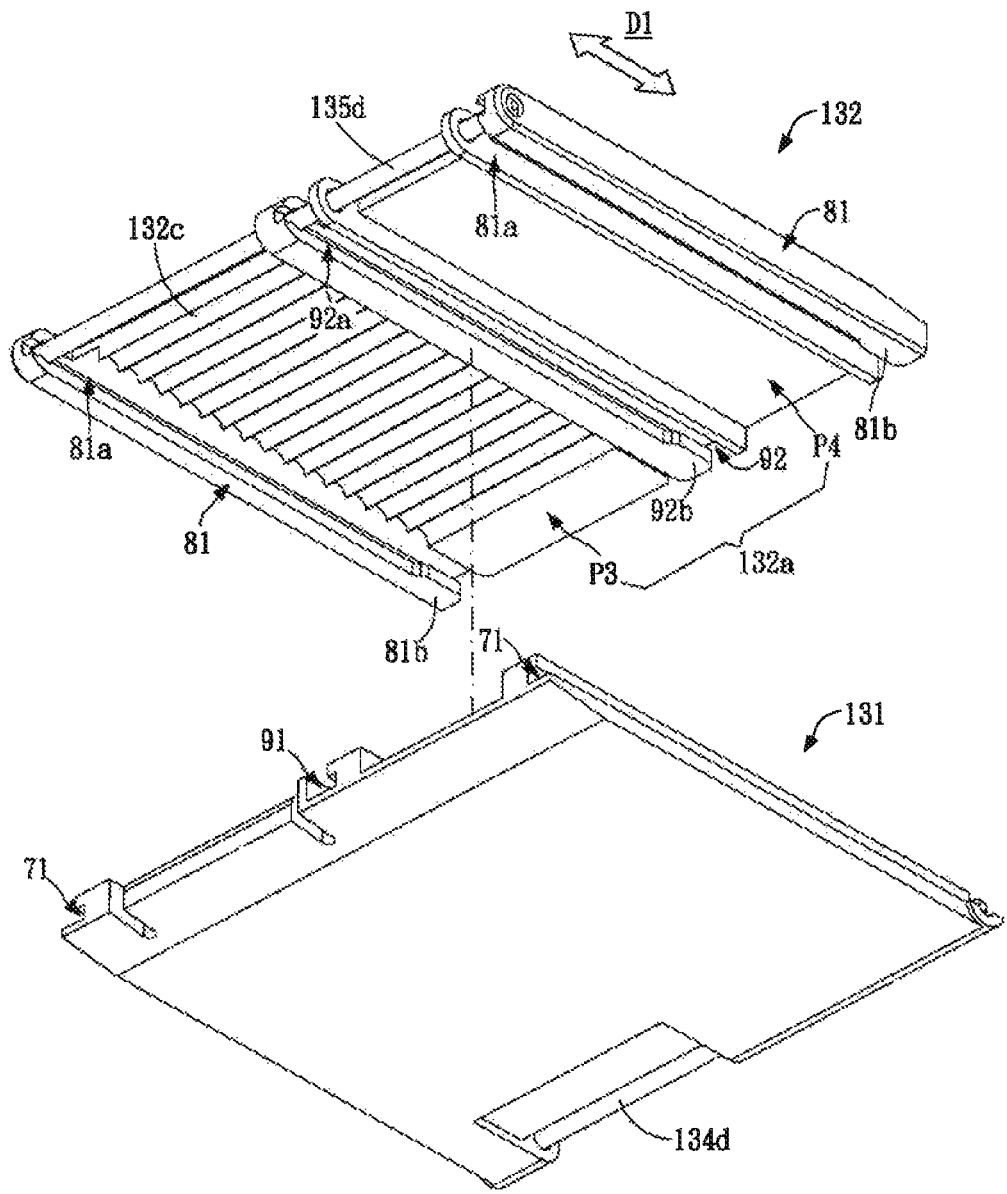
FIG. 3A is a schematic view (1) of part of elements of a specific embodiment of the present invention.
Figure 3B:
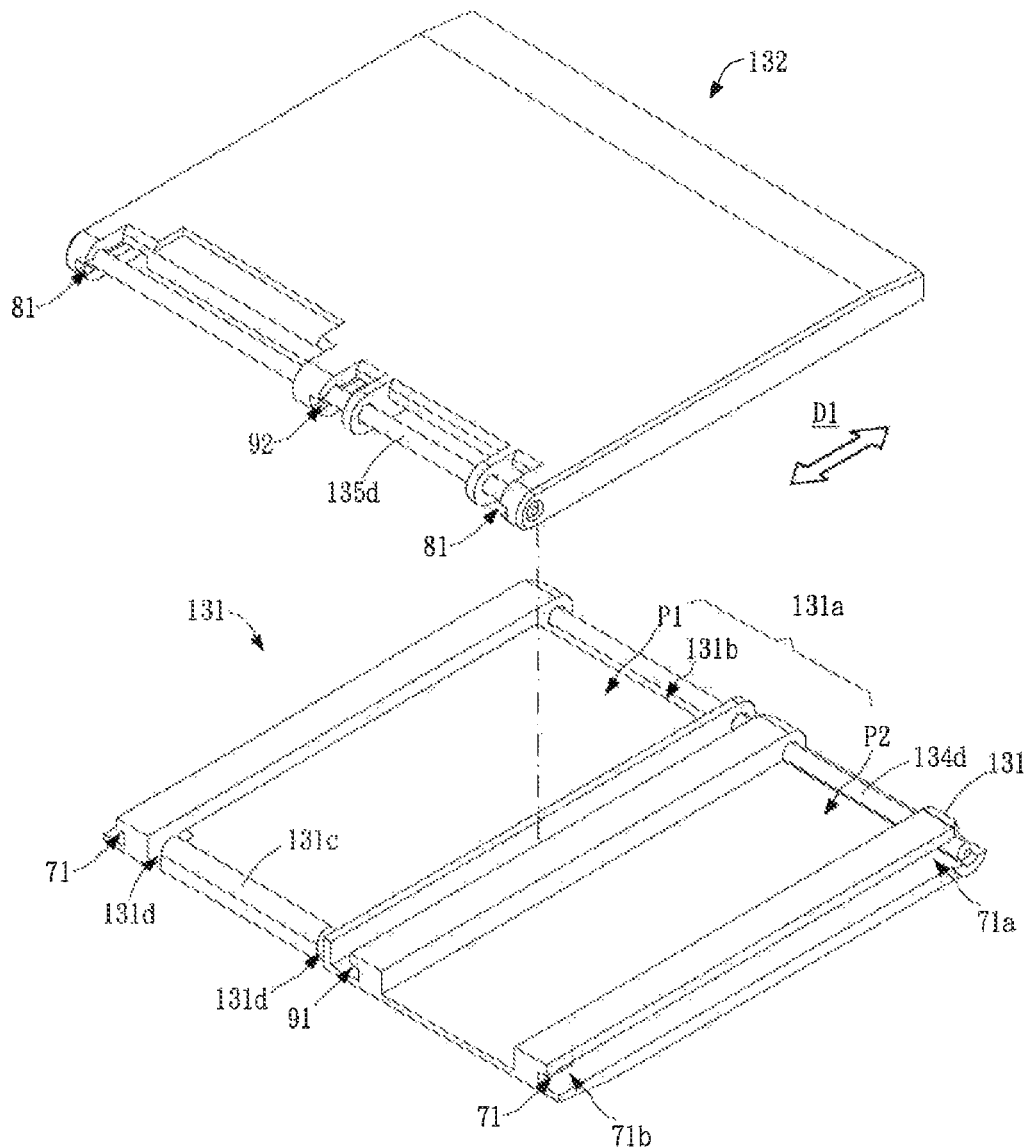
FIG. 3B is a schematic view (2) of part of elements of a specific embodiment of the present invention.

Please refer to FIG. 3A and FIG. 3B, in which two side edges of the first plate 131 are respectively provided with a guide slot 71, where the two guide slots 71 extend from a first connecting edge 131b to one side of a projecting tooth 132c, and are parallel to the sliding direction D1. The first plate 131 has a first surface 131a, a first connecting edge 131b, and a projecting tooth 131c. The first connecting edge 131b is substantially perpendicular to the sliding direction D1, located on one side of the first surface 131a, and is rotatably connected to the first side edge 111 of the computer body 11. The first surface 131a has an engagement slot 91, where the card 91 is parallel to the sliding direction D, so as to partition the first surface 131a into a first part P1 and a second part P2. The projecting tooth 131c is located on one side of the first part P1. The first connecting edge 131b is pivotally connected on the first side edge 111 of the computer body 11 through a pivot member 134d, so that the first plate 131 is capable of rotating with respect to the computer body 11.

Please refer to FIG. 3A and FIG. 3B, in which both sides of the second plate 132 are respectively provided with a fitting portion 81, where the two fitting portions are correspondingly fitted into the two guide slots 71 of the first plate 131, so that the second plate 132 is slidably connected to the first plate 131. The second plate 132 has a second surface 132a, a second connecting edge 132b, and a plurality of grooves 132c disposed on the second surface 132a. The second connecting edge 132b is substantially perpendicular to the sliding direction D1. The second surface 132a has an engagement portion 92 correspondingly engaged with the engagement slot 91. The engagement portion 92 is parallel to the sliding direction D1, and partitions the second surface 132a into a third part P3 and a fourth part P4, where the third part P3 faces the first part P1, and the fourth part faces the second part P2. The grooves 132c are disposed on the third part P3; the fourth part P4 and the second part P2 form a receiving space 20 together.

In addition, in an embodiment, as shown in FIG. 2, the computer body 11 has a concave portion 118, which is adjacent to the first side edge 111. The size of the concave portion 118 matches the size of the telescopic structure 12. When the display 12 and the computer body assume a closed state, the telescopic structure 13 can be placed in the concave portion 118.

Figure 4:
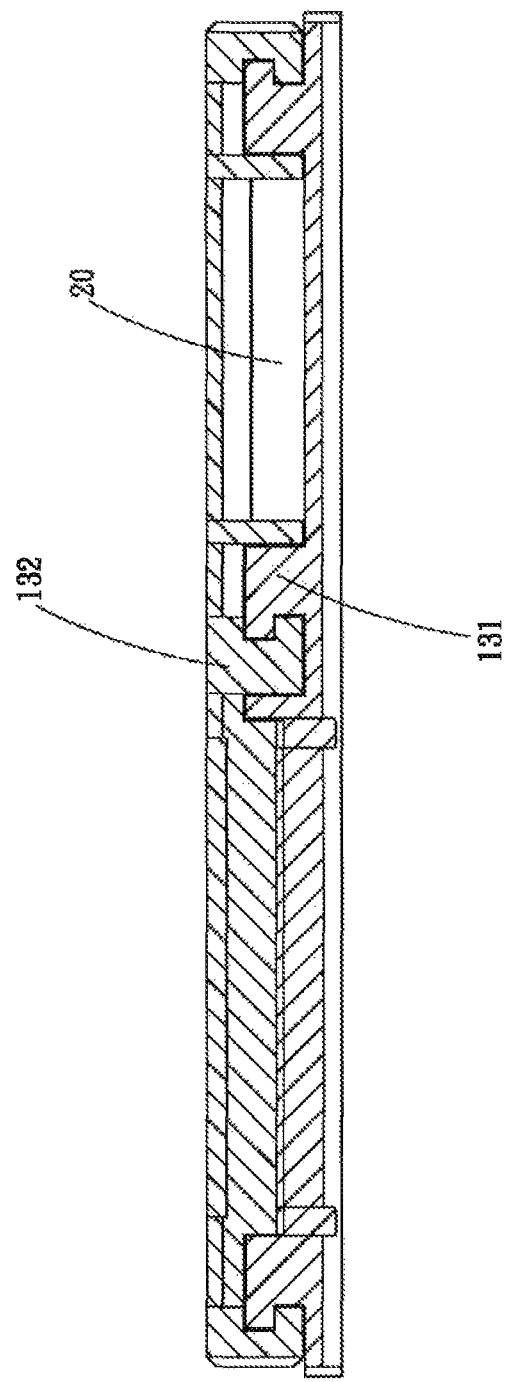
FIG. 4 is a sectional view of part of elements perpendicular to a sliding direction of a specific embodiment of the present invention.

Please refer to FIG. 4, in which the computer body 11 and the display 12 transmit a signal to each other through a signal cable having two ends respectively electrically connected to the display 12 and the computer body 11, and the receiving space 20 allows a cable body of the signal cable to go through and be placed therein.

Figure 5:
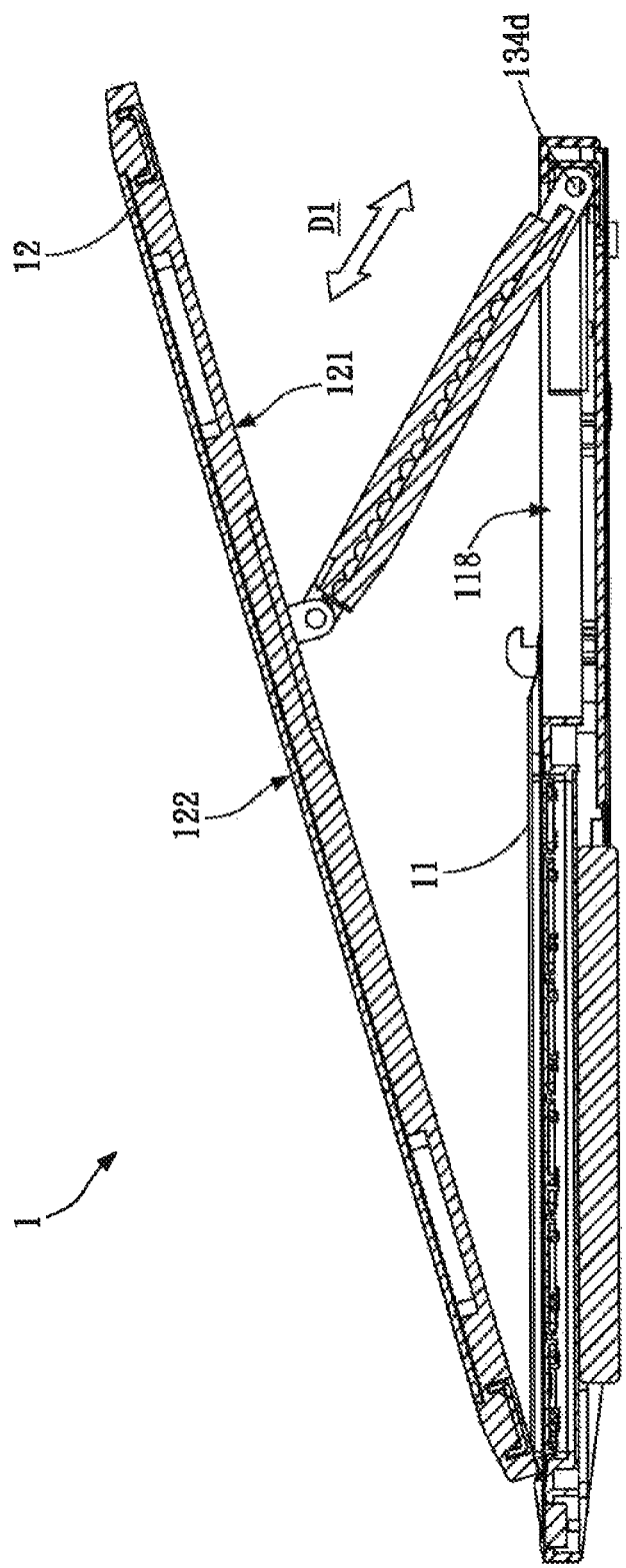
FIG. 5 is a side view of a specific embodiment of the present invention.
Figure 6:
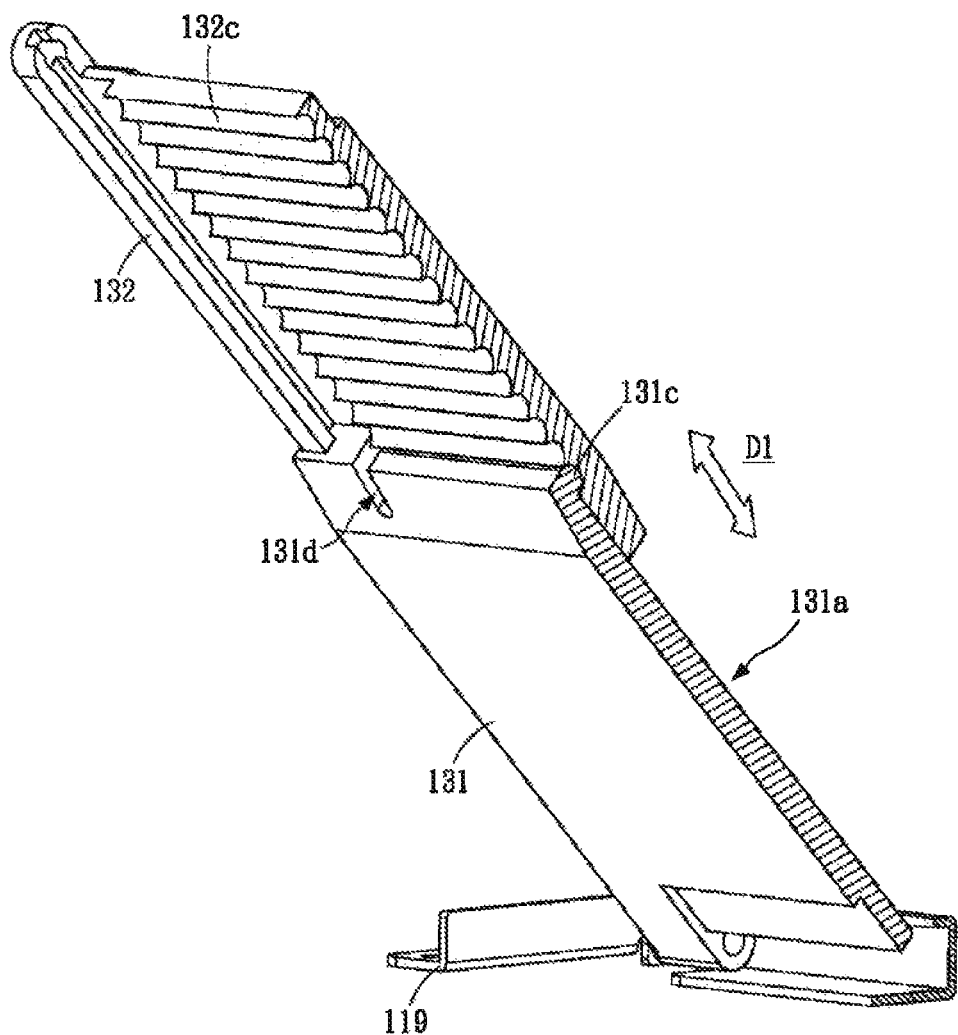
FIG. 6 is a schematic view (3) of part of elements of a specific embodiment of the present invention.

Please refer to FIG. 5 and FIG. 6, in which the projecting tooth 131c projects from the first surface 131a and the both sides of the first surface 131a are respectively provided with an undercut 131d. Through the undercut 131d, the projecting tooth 131c bends and deforms with respect to the first plate 131 when the projecting tooth 131c moves to an uplifted position between the two grooves 132c. When the projecting tooth 131c moves to the groove 132c, through the resilience of the material of the first plate 131, the projecting tooth 131c can be automatically fitted into the groove 132c. In addition, the force of the projecting tooth 131c fitting into the groove 132c depends on the resilience of the first plate 131, so that the force of the projecting tooth 131c fitting into the groove 132c can be adjusted through adjusting the width of the undercut 131d perpendicular to the sliding direction D1 or the depth of the undercut 131d perpendicular to the sliding direction D1. The wider or deeper the undercut 131d is, the force of the projecting tooth 131c fitting into the groove 132c is smaller.

Please refer to FIG. 5 and FIG. 6, in which the overall appearance of the plurality of grooves 132c is a wave-like shape, and the geometry appearance of each groove matches the projecting tooth 131c, so that the projecting tooth 131c is engaged with the grooves. The second connecting edge is rotatably connected to the backside 121 of the display 12, and the second surface 132b faces the first surface, so that the projecting tooth 131c of the first plate 131 is engaged with one of the groove 132c. When the display 12 assumes an angle through the support of the telescopic structure 13, the second plate 132 may slide along the sliding direction D1 with respect to the first plate 131, so that the projecting tooth is engaged with different grooves 132c to adjust the length of the telescopic structure 13, so as to change the angle accordingly, thereby realizing multiple changes of the included angle between the display 12 and the computer body 11.

Please refer to FIG. 2 again, in which in an embodiment, the guide slot 71 of the first plate 131 has an opening 71a and a first limiting portion 71b respectively at two ends. The fitting portion 81 of the second plate 132 has an insertion portion 81a and a second limiting portion 81b respectively at two ends. The insertion portion 81 is inserted into the guide slot 71 from the opening 71a so that the fitting portion 81 is fitted into the guide slot 71. The fitting portion 81 can be further moved along the direction of the insertion until the second limiting portion 81b is blocked by the first limiting portion 71b. The second limiting portion 81b and the first limiting portion 71b are limited by each other, so that the fitting portion 81 cannot be separated from the guide slot 71 along the direction of the insertion.

Please refer to FIG. 2 again, in which in an embodiment, the engagement slot 91 of the first plate 131 has an opening 91a and a first limiting portion 91b respectively at two ends. The engagement portion 92 of the second plate 132 has an insertion portion 92a and a second limiting portion 92b respectively at two ends. The insertion portion 92a is inserted into the engagement slot 91 from the opening 91a so that the engagement portion 92 is engaged with the engagement slot 91. The engagement portion 92 can be further moved along the direction of the insertion until the second limiting portion 92b is blocked by the first limiting portion 91b. The second limiting portion 92b and the first limiting portion 91b are limited by each other, so that the engagement portion 92 cannot be separated from the engagement slot 91 along the direction of the insertion.

Please refer to FIG. 2 again, in which in an embodiment, the telescopic structure 13 further includes a first elastic member 134 and a second elastic member 135, where the first elastic member 134 and the second elastic member 135 may be torsion springs or v-shaped springs; in this embodiment the torsional spring is taken as an example, which is not limited herein.

The first elastic member 134 has a spring body 134a, where the spring body 134a has a through hole in the center, and has a first abutting portion 134b and a second abutting portion 134c respectively at two ends. The first elastic member 134 is disposed on the first connecting edge 131b by passing the pivot member 134d through the through hole of the spring body 134a and pivotally connecting the pivot member 134d on the first connection edge 131b of the first plate 131. The first abutting portion 134b and the second abutting portion 134c of the first elastic member 134 are respectively used for abutting against the computer body 11 and the first plate 131.

The second elastic member 135 has a spring body 135a, where the spring body 135a has a through hole in the center, and has a first abutting portion 135b and a second abutting portion 135c respectively at two ends. The second elastic member 134 is disposed on the second connecting edge 132b by passing a pivot member 135d through the through hole of the spring body 135a and pivotally connecting the pivot member 135d on the second connecting edge 132b of the second plate 132. The first abutting portion 135b and the second abutting portion 135c of the second elastic member 135 are respectively used for abutting against the display 12 and the second plate 132.

When the display 12 and the computer body 11 assume a closed state (for example, the display 12 is buckled into the computer body 11 through a buckle, which is a prior art, and is not repeated in this specification), the first abutting portion 134b and the second abutting portion 134c of the first elastic member 134 are respectively pressed by the computer body 11 and the first plate 131 for accumulating the elastic force; likewise, the first abutting portion 135b and the second abutting portion 135c of the second elastic member 135 are respectively pressed by the display 12 and the second plate 132 for accumulating the elastic force. When the user releases the buckling state between the display 12 and the computer body 11, the first elastic member 134 and the second elastic member 135 release the accumulated elastic forces, so that when the display 12 and the computer body 11 assume a slightly open state, the user can easily adjust a viewing angle through pulling the display 12.

Please refer to FIG. 2 again, in which in an embodiment, the computer body 11 further includes a metal plate 119, where the first abutting portion 134b of the first elastic member 134 abuts against the metal plate 119. The shell of the computer body 11 is generally made of plastic materials, and if the first abutting portion 134b of the first elastic member 134 directly abuts against the shell of computer body 11, the portion of the computer body 11 being abutted against may be deformed or even damaged.

Figure 7:
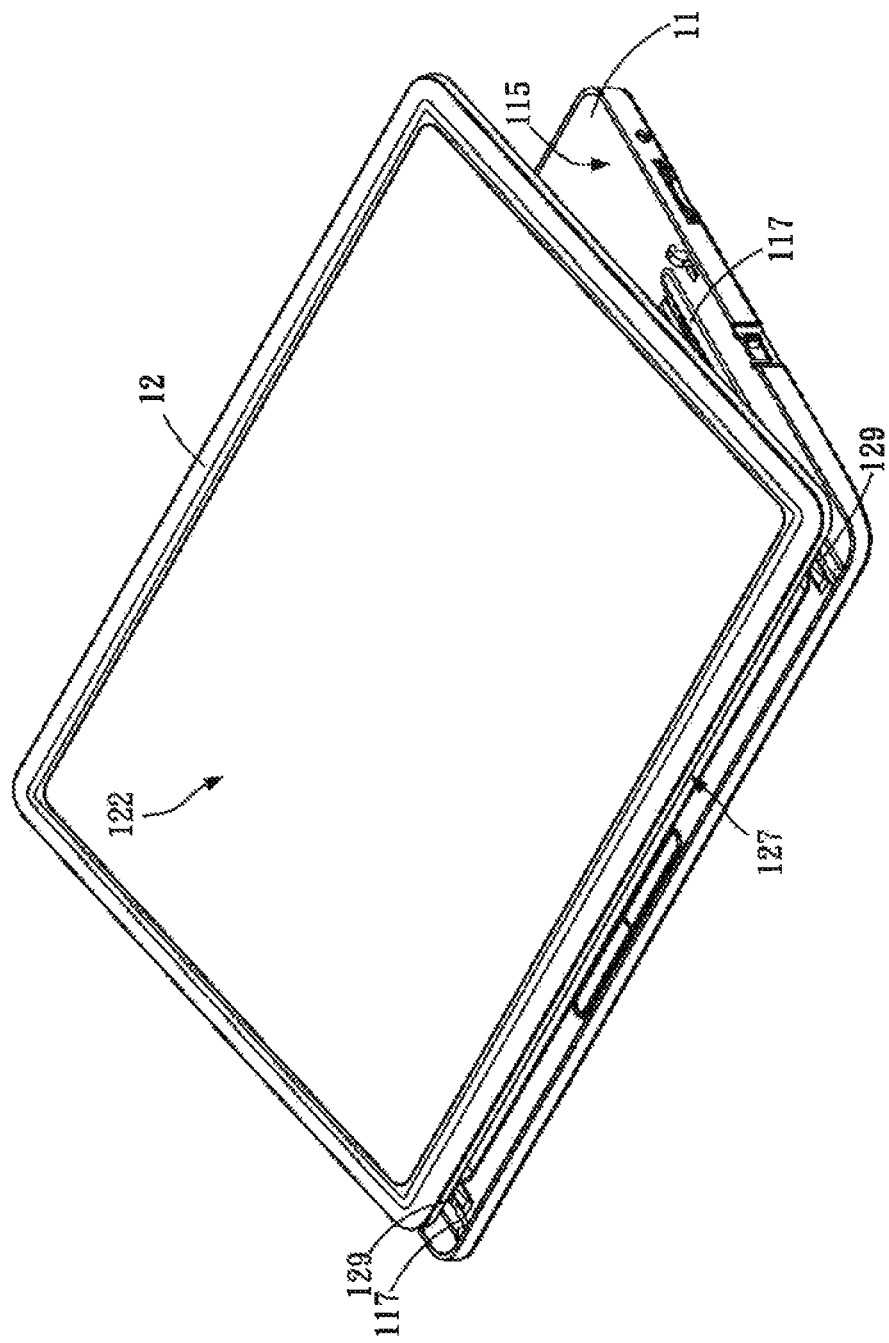
FIG. 7 is a schematic view (3) of a specific embodiment of the present invention.
Figure 8:
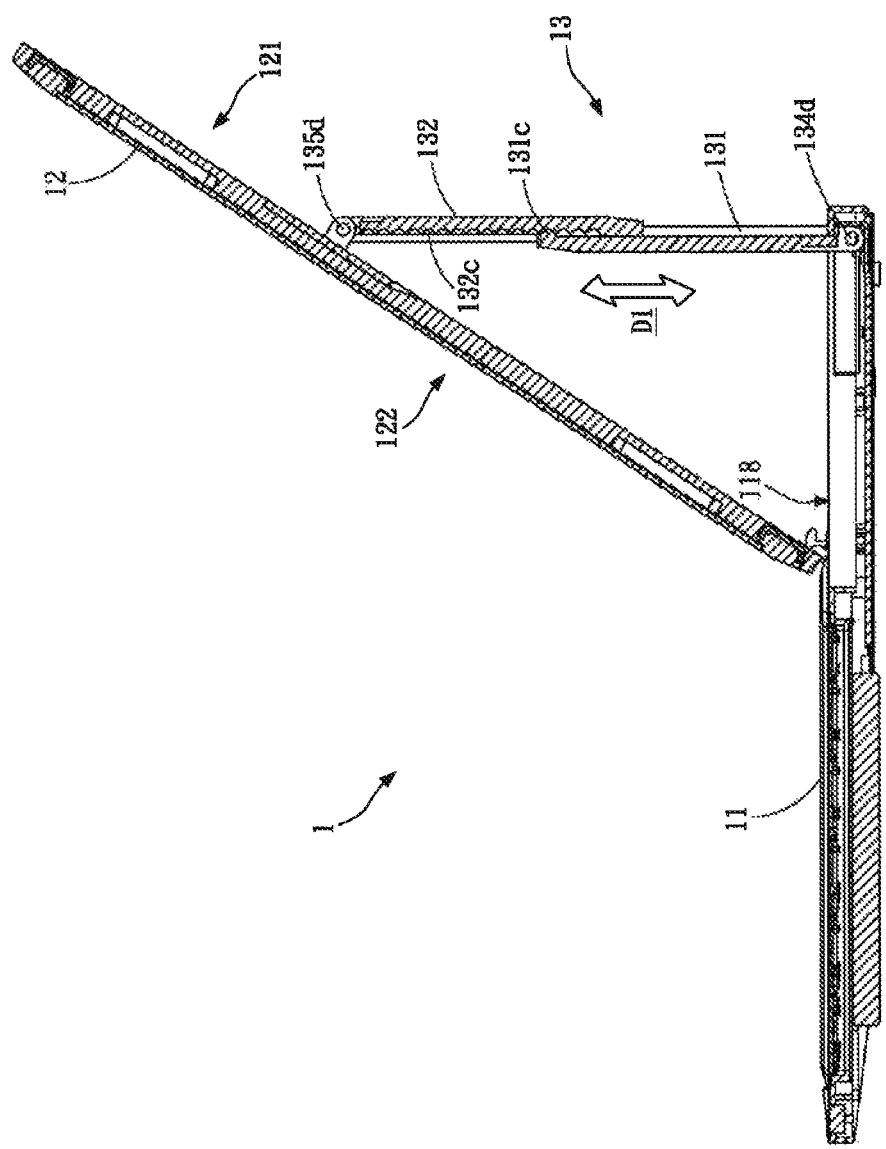
FIG. 8 is a schematic operation view (1) of a specific embodiment of the present invention.
Figure 9:
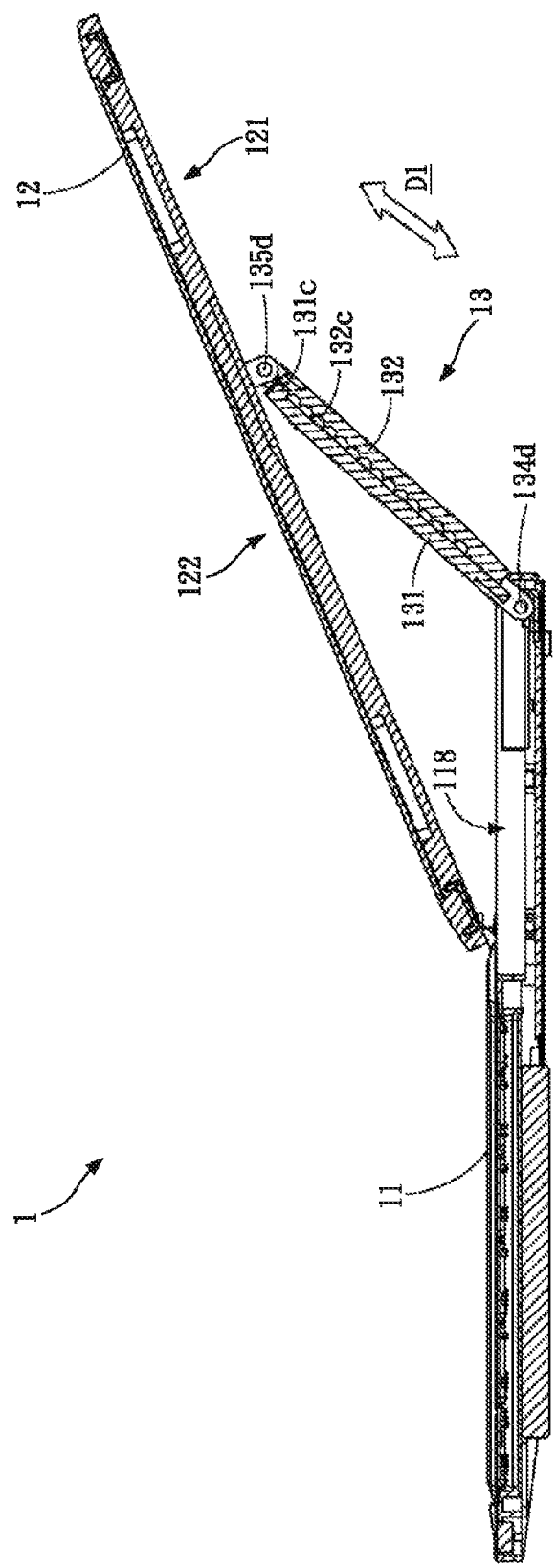
FIG. 9 is a schematic operation view (2) of a specific embodiment of the present invention.

Please refer to FIG. 7, in which in an embodiment, two slide rails 117 are disposed on both sides of an upper surface of the computer body 11, where the two slide rails 117 are perpendicular to the first side edge 111. The display 12 has a bottom edge 127 perpendicular to the two slide rails 117, and provided with a connecting rod 129 respectively at two ends. The two connecting rods 129 are respectively engaged with the two slide rails 117 and are capable of sliding along the two slide rails 117, so that the display 12 may assume open states at different angles with respect to the computer body 11, as shown in FIG. 8 and FIG. 9. The bottom edge 127 is the edge of the display 12 adjacent to the computer body 11 when the display 12 assumes the open state with respect to computer body 11.

In an embodiment, the computer body 11 and the display 12 are respectively replaced with a first shell and a second shell so as to form an angle adjustment device. That is, any device having the first shell and the second shell can reach the objective of adjusting the opening angle between the first shell and the second shell according to the idea of the embodiment described above.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A portable electronic device, comprising:
a computer body, having a first side edge;
a display, having a backside; and
a telescopic structure, comprising:
a first plate, having a first surface, a first connecting edge and a projecting tooth, wherein the first connecting edge is located on one side of the first surface and is rotatably connected to the first side edge of the computer body, and the projecting tooth projects from the first surface; and
a second plate, facing the first plate, slidably coupled to the first plate, and having a second surface, a second connecting edge and a plurality of grooves disposed on the second surface, wherein the second connecting edge is located on the other side of the second surface opposite to the first connecting edge and is rotatably connected to the backside of the display, and the second surface faces the first surface so that the projecting tooth of the first surface is engaged with one of the grooves;
wherein when the display assumes an angle with respect to the computer body through the support of the telescopic structure, the second plate is capable of sliding along a sliding direction with respect to the first plate, so that the projecting tooth is engaged with the different grooves, so as to adjust the length of the telescopic structure and change the angle accordingly.

2. The portable electronic device according to claim 1, wherein the first plate has an engagement slot located on the first surface and parallel to the sliding direction; the engagement slot partitions the first surface into a first part and a second part; and the projecting tooth is located on one side of the first part.

3. The portable electronic device according to claim 2, wherein the second plate member has an engagement portion located on the second surface and parallel to the sliding direction, used for being engaged with the engagement slot; the engagement portion partitions the second surface into a third part and a fourth part, respectively facing the first part and the second part; the grooves are disposed on the third part; and the second part and the fourth part form a receiving space.

4. The portable electronic device according to claim 3, wherein two side edges of the first plate are respectively provided with a guide slot, extending from the first connecting edge to one side of the projecting tooth and being parallel to the sliding direction; and two side edges of the second plate are respectively provided with a fitting portion, and the fitting portion is fitted into the guide slot.

5. The portable electronic device according to claim 4, wherein the guide slot has an opening and a first limiting portion respectively at two ends; the fitting portion has an insertion portion and a second limiting portion respectively at two ends; the insertion portion is inserted into the guide slot from the opening so that the fitting portion is fitted into the guide slot; and the second limiting portion is limited by the first limiting portion, so that the fitting portion is incapable of being separated from the guide slot along the direction of the insertion.

6. The portable electronic device according to claim 3, wherein the engagement slot has an opening and a first limiting portion respectively at two ends; the engagement portion has an insertion portion and a second limiting portion respectively at two ends; the insertion portion is inserted into the engagement slot from the opening so that the engagement portion is engaged with the engagement slot; and the second limiting portion is limited by the first limiting portion, so that the engagement portion is incapable of being separated from the engagement slot along the direction of the insertion.

7. The portable electronic device according to claim 3, wherein telescopic structure further comprises a first elastic member and a second elastic member, respectively disposed on the first connecting edge and the second connecting edge; the first elastic member provides an elastic force for the first plate to rotate with respect to the computer body; and the second elastic member provides an elastic force for the second plate to rotate with respect to the display.

8. The portable electronic device according to claim 7, wherein the computer body further comprises a metal plate; and the first elastic member abuts against the metal plate at one end to provide the elastic force for the first plate to rotate with respect to the computer body.

9. The portable electronic device according to claim 3, further comprising a signal cable, disposed in the receiving space, and having two ends electrically connected to the display and the computer body respectively.

10. The portable electronic device according to claim 1, wherein the computer body further comprises a concave portion, adjacent to the first side edge, and used for receiving the telescopic structure.

11. The portable electronic device according to claim 1, wherein the computer body comprises two slide rails, perpendicular to the first side edge and respectively disposed on two sides of an upper surface of the computer body; and the display has a bottom edge, perpendicular to the two slide rails, and having two ends respectively connected to the two slide rails and capable of sliding along the two slide rails.

* * * * *